(12) United States Patent
Yang

(10) Patent No.: US 8,899,694 B2
(45) Date of Patent: Dec. 2, 2014

(54) BRAKE SYSTEM FOR VEHICLE

(75) Inventor: Il Suk Yang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 13/418,885

(22) Filed: Mar. 13, 2012

(65) Prior Publication Data

US 2013/0140878 A1  Jun. 6, 2013

(30) Foreign Application Priority Data

Dec. 1, 2011  (KR) .......................... 10-2011-0127558

(51) Int. Cl.
*B60T 13/52* (2006.01)

(52) U.S. Cl.
CPC *B60T 13/52* (2013.01); *G60T 15/04* (2013.01)
USPC .......................................... 303/12; 303/114.3

(58) Field of Classification Search
USPC ..................... 303/12, 113.3, 114.3
See application file for complete search history.

(56) References Cited

U.S. PATENT DOCUMENTS

| | | | |
|---|---|---|---|
| 7,182,300 B2* | 2/2007 | Yonezawa | 248/74.2 |
| 7,475,951 B2* | 1/2009 | Ichikawa | 303/12 |
| 2012/0237366 A1* | 9/2012 | Pursifull | 417/54 |

FOREIGN PATENT DOCUMENTS

| | | |
|---|---|---|
| KR | 10-2006-0000082 A | 1/2006 |
| KR | 10-0656619 B1 | 12/2006 |
| KR | 10-2007-0064200 A | 6/2007 |
| KR | 10-0767486 B1 | 10/2007 |

* cited by examiner

*Primary Examiner* — Anna Momper
(74) *Attorney, Agent, or Firm* — Morgan, Lewis & Bockius LLP

(57) ABSTRACT

A brake system for a vehicle having a VIS actuator of an intake manifold, a vacuum pipe connected to the VIS actuator, and a vacuum pump connected to the vacuum pipe may be provided, which includes a vacuum hose having one end connected to the vacuum pipe to generate additional negative pressure, wherein the vacuum hose may be connected to a vacuum chamber. The brake negative pressure may be supplemented without increasing the capacity of the vacuum pump to improve the braking performance.

1 Claim, 3 Drawing Sheets

BRAKE SYSTEM FOR VEHICLE

CROSS-REFERENCE TO RELATED APPLICATION

The present application claims priority to Korean Patent Application No 10-2011-0127558, filed on Dec. 1, 2011, the entire contents of which is incorporated herein for all purposes by this reference.

BACKGROUND OF THE INVENTION

1. Field of the Invention

The present invention relates to a brake system for a vehicle, and more particularly, to a brake system for a vehicle, which can supplement brake negative pressure without increasing the capacity of a vacuum pump.

2. Description of Related Art

In general, as a vehicle becomes large-sized and has high speed, a brake booster is used in a brake pedal in order to ensure a braking force of the vehicle. The brake booster has a power piston that is installed separately from a mast cylinder, and high pressure is generated by applying a differential pressure between vacuum and atmospheric pressure to the power piston or by increasing the force applied thereto.

Such a brake booster may be classified into a vacuum brake booster that uses a differential pressure between vacuum and atmospheric pressure and a compressed air brake booster that uses compressed air pressure. The vacuum brake booster is a device that applies large force to the brake by applying a differential force between negative pressure that is generated from an intake manifold of an engine or a vacuum pump and atmospheric pressure to the booster.

In the case of using such a vacuum pump, negative pressure that is generated from the intake manifold of the engine is typically used. FIG. 3 is a schematic view illustrating a brake system in the related art. As illustrated in FIG. 3, according to a brake system 200 in the related art, in order to generate negative pressure, a VIS (variable induction system) actuator 210 of an intake manifold is connected to a VIS vacuum pipe 230 through a VIS valve 220. The VIS vacuum pipe 230 is connected to a vacuum pump 250 through a brake nipple 240. The vacuum pump 250 generates and applies necessary negative pressure to a brake booster.

In the brake system 200 in the related art, however, the whole negative pressure that is required in the engine is generated by the vacuum pump, and if the negative pressure is insufficient, it is necessary to increase the capacity of the vacuum pump 250. In the case of increasing the capacity of the vacuum pump 250, frictional force is increased depending on the increase of a driving force of the vacuum pump 250, and thus load sharing occurs for the driving force of the weighted vacuum pump 250 to deteriorate the fuel efficiency and engine output torque. Further, in the case of using the negative pressure that is generated in the intake manifold of the engine, the generated negative pressure is not uniform, but varies depending on the surrounding environment, such as low air density in the high elevated areas, resulting in that it is difficult to ensure uniform negative pressure that is necessary for the booster.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake system for a vehicle, which has an improved brake performance through supplement of brake negative pressure without increasing the capacity of a vacuum pump.

In an aspect of the present invention, a brake system for a vehicle having a VIS (Variable Induction System) actuator of an intake manifold, a vacuum pipe connected to the VIS actuator, and a vacuum pump connected to the vacuum pipe, may include a vacuum hose having a first end connected to the vacuum pipe to generate additional negative pressure, wherein a second end of the vacuum hose is connected to a vacuum chamber.

A check valve is connected between the vacuum chamber and the intake manifold.

Accordingly, additional intake pressure for supplement the negative pressure of the brake system can be supplied from the vacuum chamber to the vacuum pump.

The brake system for a vehicle according to the aspect of the present invention may further include a "T"-shaped nipple connected to an end portion of the vacuum hose to serve as a joint with the vacuum pipe.

Accordingly, it is possible to intake air from the vacuum pipe to the vacuum hose without leaking air.

As described above, according to the present invention, the brake negative pressure in the brake system for a vehicle can be supplemented without increasing the capacity of the vacuum pump.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
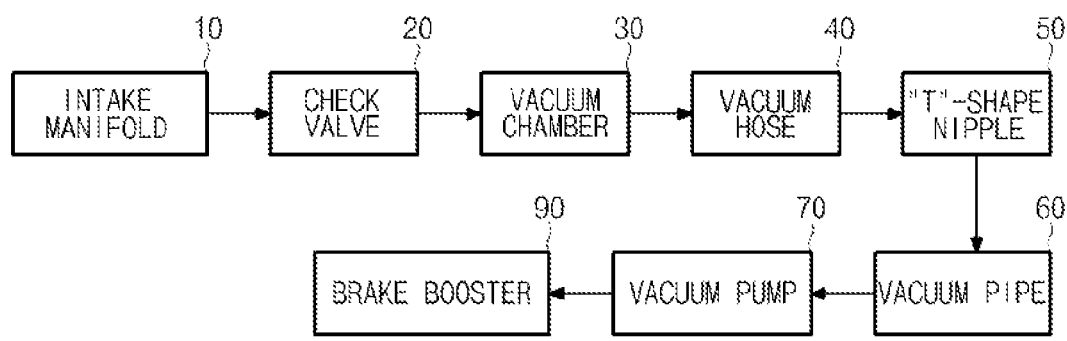
FIG. 1 is a schematic diagram illustrating the order of additional intake pressure transfer in a brake system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described with reference to the accompanying drawing.

Figure 2:
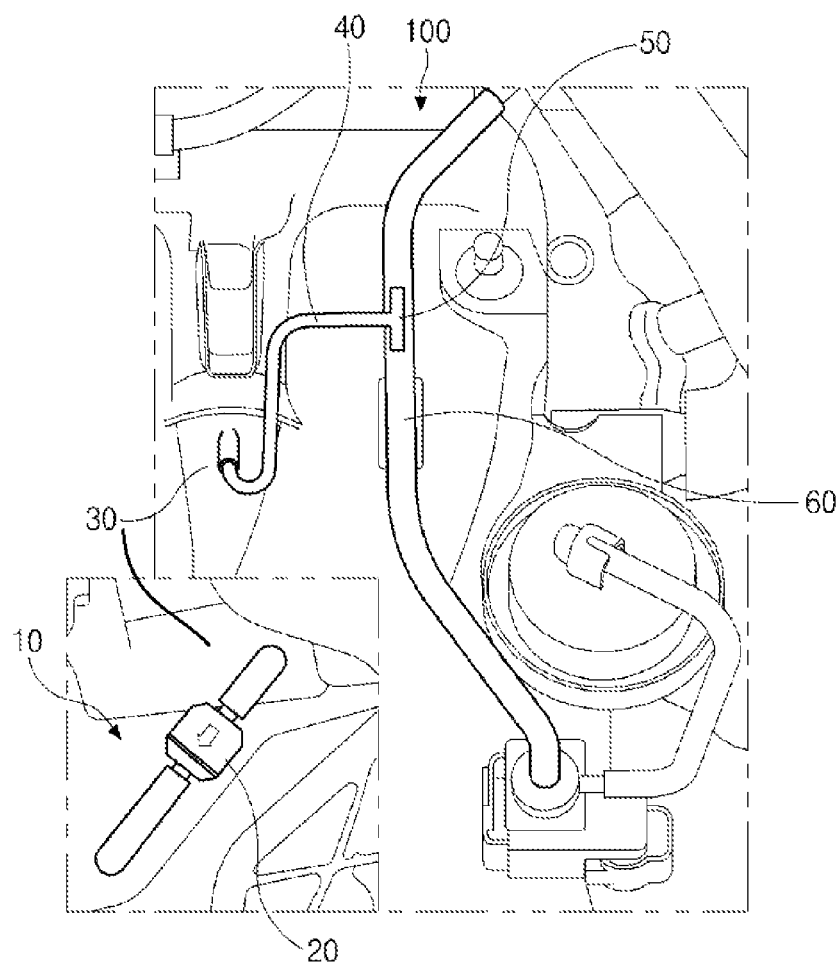
FIG. 2 is a perspective view illustrating the arrangement of a brake system for a vehicle according to an exemplary embodiment of the present invention.
Figure 3:
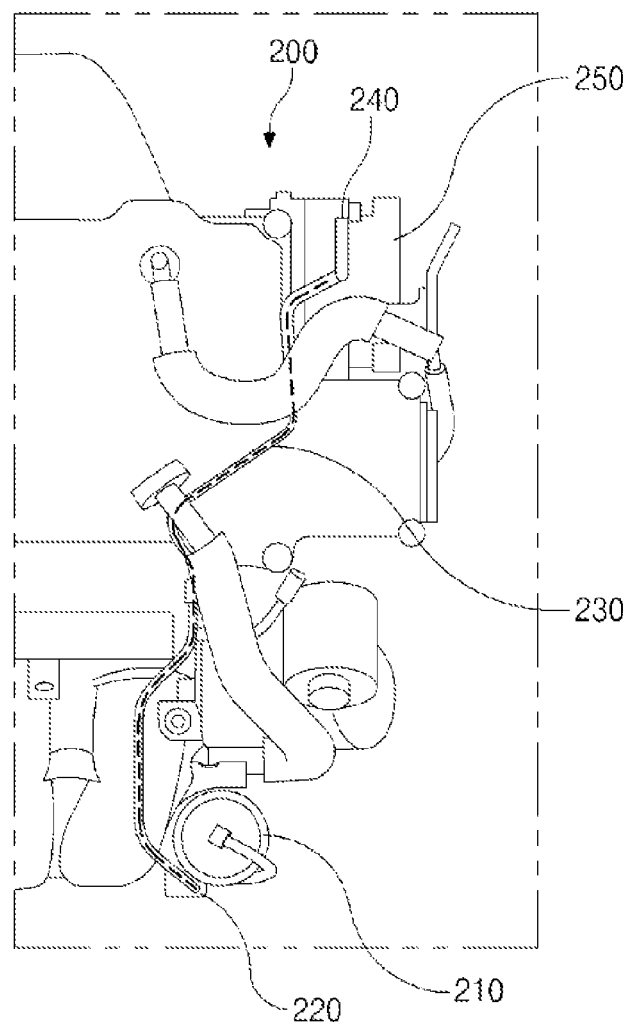
FIG. 3 is a perspective view illustrating the arrangement of a brake system for a vehicle in the related art.

FIG. 1 is a schematic diagram illustrating the order of additional intake pressure transfer in a brake system for a vehicle according to an exemplary embodiment of the present invention, and FIG. 2 is a perspective view illustrating the arrangement of a brake system for a vehicle according to an exemplary embodiment of the present invention. Referring to FIGS. 1 and 2, a brake system for a vehicle according to an exemplary embodiment of the present invention will be described.

A brake system 100 for a vehicle according to an exemplary embodiment of the present invention, having a VIS actuator of an intake manifold 10, a vacuum pipe 60 connected to the VIS actuator, and a vacuum pump 70 connected to the vacuum pipe 60 to generate and supply negative pressure to a brake booster 90, includes a vacuum hose 40 having one end connected to the vacuum pipe 60 to generate additional negative pressure.

One end of the vacuum hose 40 is connected to the vacuum pipe 60 of the brake system, and the other end thereof is connected to a vacuum chamber 30. The vacuum hose 40 transfers additional intake pressure provided from the vacuum chamber 30 to the brake system 100. The vacuum chamber 30 is positioned inside the intake manifold 10, and a check valve 20 is provided between the intake manifold 10 and the vacuum chamber 30. The check valve 20 makes air flow in a predetermined direction to prevent a backward flow of the air. Accordingly, by making the air sucked into the vacuum chamber 30 through the vacuum hose 40, the additional negative pressure is generated.

The vacuum hose 40 is a flexible hose or is in the form of a pipe or tube. The vacuum hose 40 may be in any shape so far as air from the vacuum chamber 30 can move through the vacuum hose 40. It is preferable that vacuum hose 40 has a short length. If the length of the vacuum hose 40 is too long, the arrangement of the brake system becomes complicated. As described above, the additional negative pressure can be formed only by additionally providing the vacuum hose 40 without adding any other complicated device in a state where the arrangement of the existing brake system is maintained.

It is preferable that the vacuum hose 40 is connected to the vacuum pipe 60 through a "T"-shaped nipple 50. Both sides of the "T"-shaped nipple 50 are connected to the interior of the vacuum pipe 60, and a lower portion thereof is connected to the vacuum hose 40. Accordingly, the air, which moves to generate the additional negative pressure, is prevented from leaking to outside.

The air flow that is made by the brake system according to an exemplary embodiment of the present invention will be described. A driver's brake pedal stepping force is transferred from the brake pedal to the brake booster 90. The air inside the brake booster 90 moves to the vacuum pump 70 by means of the intake pressure of the intake manifold 10. The air of the vacuum pump 70 moves to the vacuum pipe 60 due to the intake pressure that is generated by the VIS actuator of the intake manifold 10 and the vacuum chamber 30. The air that has moved through the vacuum pipe 60 is divided by the "T"-shaped nipple 50 inside the vacuum pipe 60, and sucked into the intake manifold 10 through the vacuum pipe 60 and the vacuum hose 40. Accordingly, negative pressure is generated in the vacuum pump 70 and is transferred to the brake booster 90.

As described above, according to an exemplary embodiment of the present invention, the brake negative pressure can be supplemented with a minimum number of components including the existing vacuum chamber 30. Further, since the arrangement of the existing vacuum pipe 60 can be used as it is, it is not necessary to set the rearrangement thereof, and the deterioration of the fuel efficiency due to the capacity increase of the vacuum pump 70 for increasing the existing negative pressure can be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake system for a vehicle having a VIS (Variable Induction System) actuator of an intake manifold, a vacuum pipe connected to the VIS actuator, and a vacuum pump connected to the vacuum pipe and disposed upstream of a vacuum chamber to generate negative pressure, comprising:
  a vacuum hose having a first end connected to the vacuum pipe to generate additional negative pressure,
  wherein a second end of the vacuum hose is connected to a vacuum chamber pre-formed between an inner surface and an outer surface of the intake manifold,
  wherein the first end of the vacuum hose and the vacuum pipe are connected through a "T"-shaped nipple,
  wherein a check valve is disposed downstream of the vacuum chamber in a flow passage of the intake manifold and fluidly connected between the intake manifold and the vacuum chamber, and
  wherein the intake manifold, the check valve, the vacuum chamber and the vacuum pump are fluid-connected in sequence.

* * * * *